Figure 5:
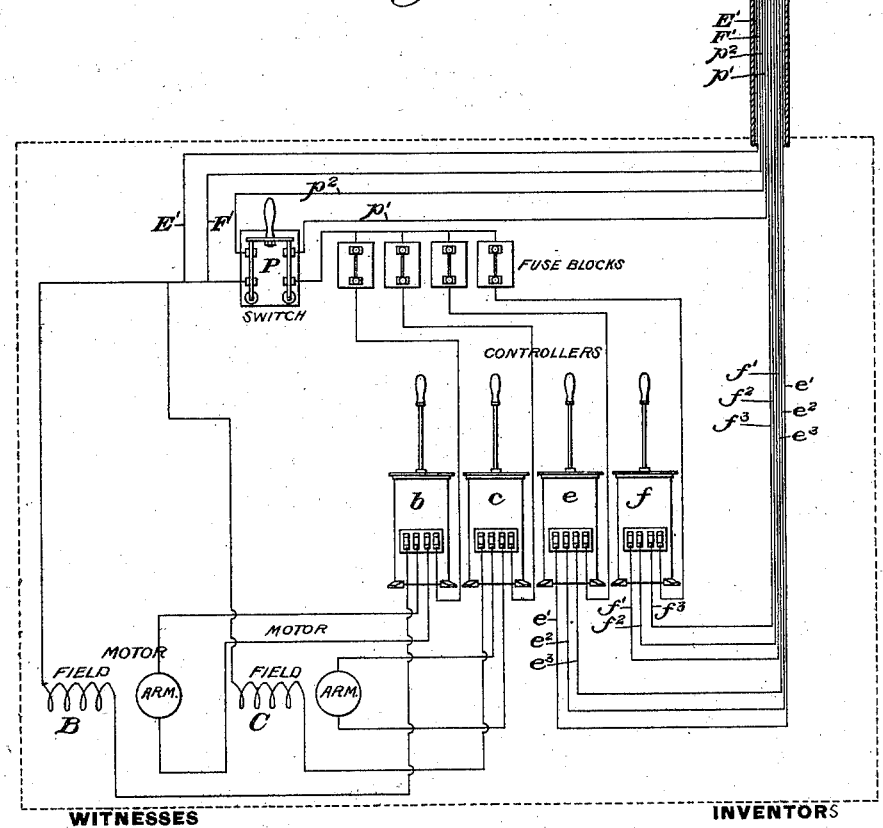

(No Model.) 6 Sheets—Sheet 1.
P. T. BERG & A. C. DINKEY.
APPARATUS FOR CHARGING AND DRAWING FURNACES.
No. 577,712. Patented Feb. 23, 1897.
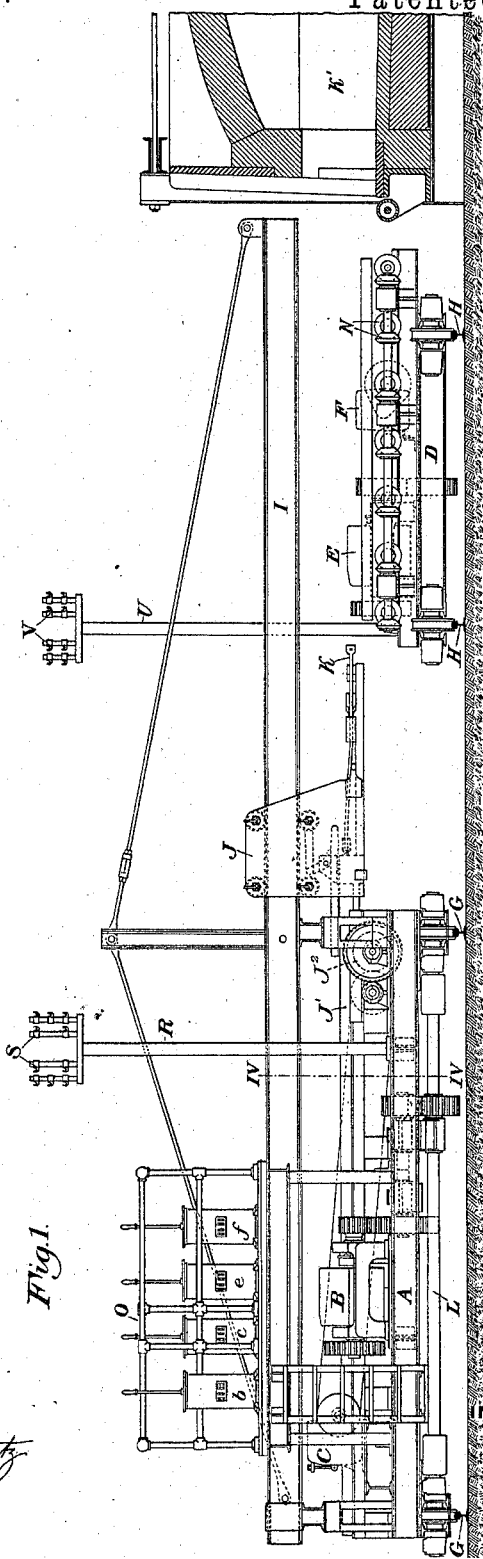

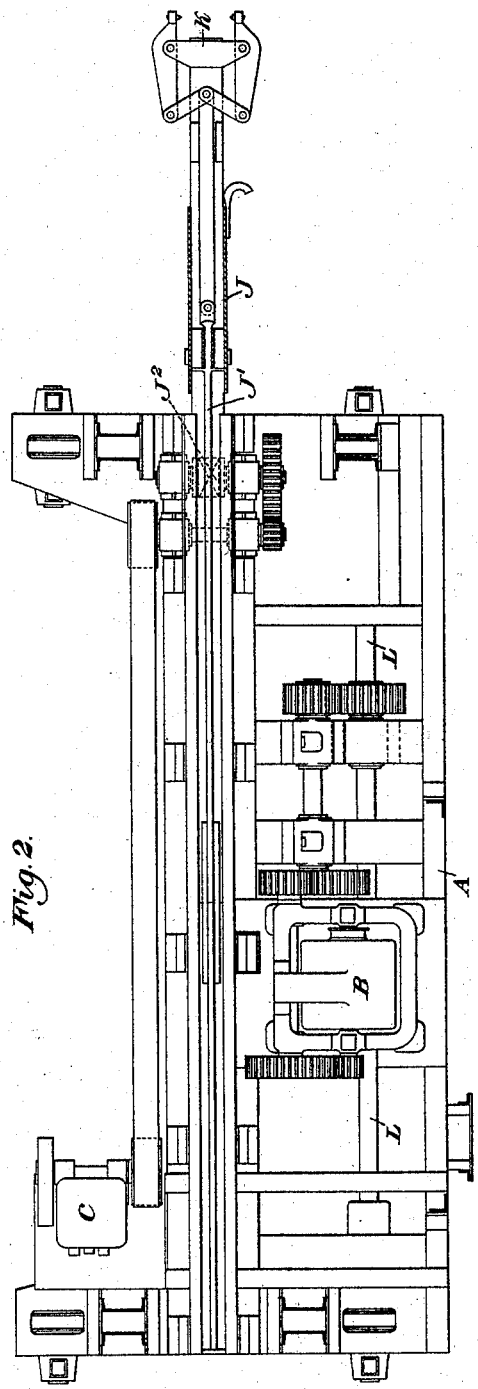

(No Model.) 6 Sheets—Sheet 3.
P. T. BERG & A. C. DINKEY.
APPARATUS FOR CHARGING AND DRAWING FURNACES.
No. 577,712. Patented Feb. 23, 1897.
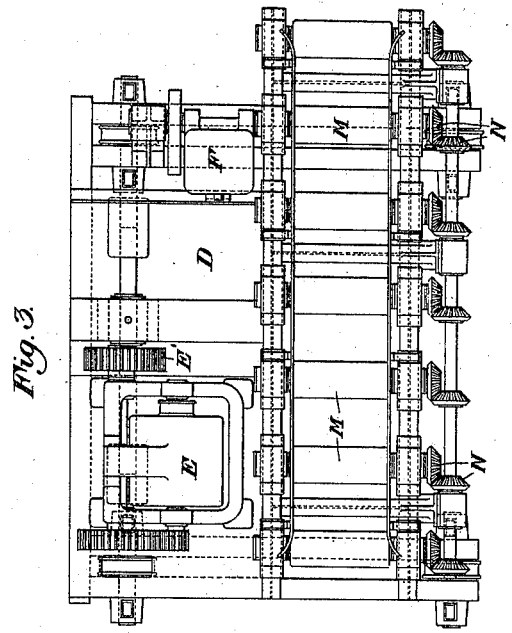
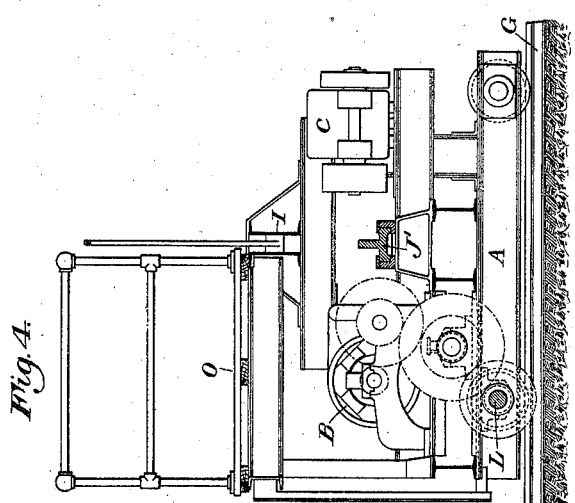

(No Model.) 6 Sheets—Sheet 4.

P. T. BERG & A. C. DINKEY.
APPARATUS FOR CHARGING AND DRAWING FURNACES.

No. 577,712. Patented Feb. 23, 1897.

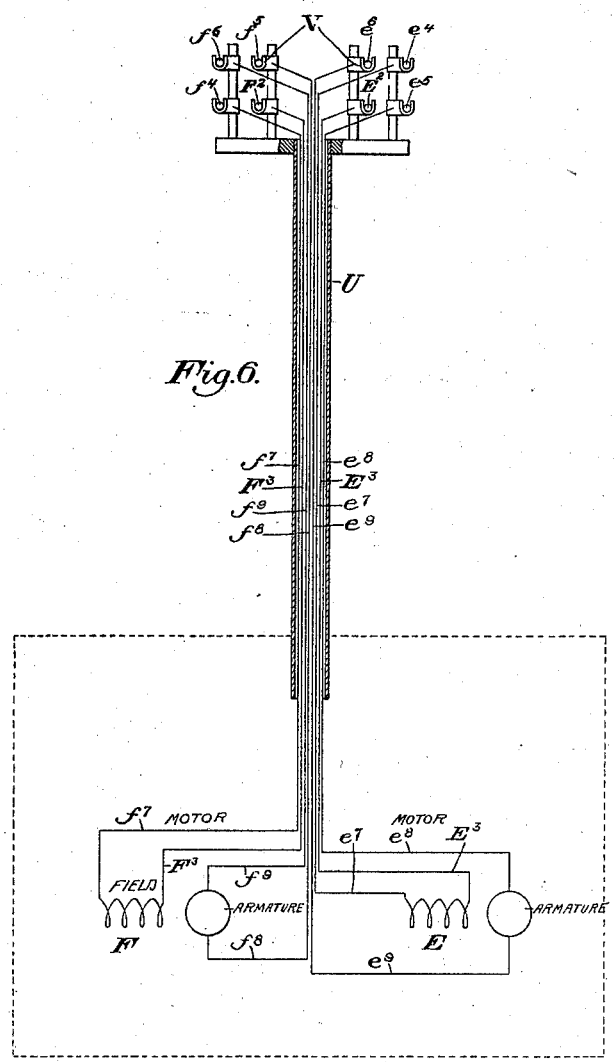

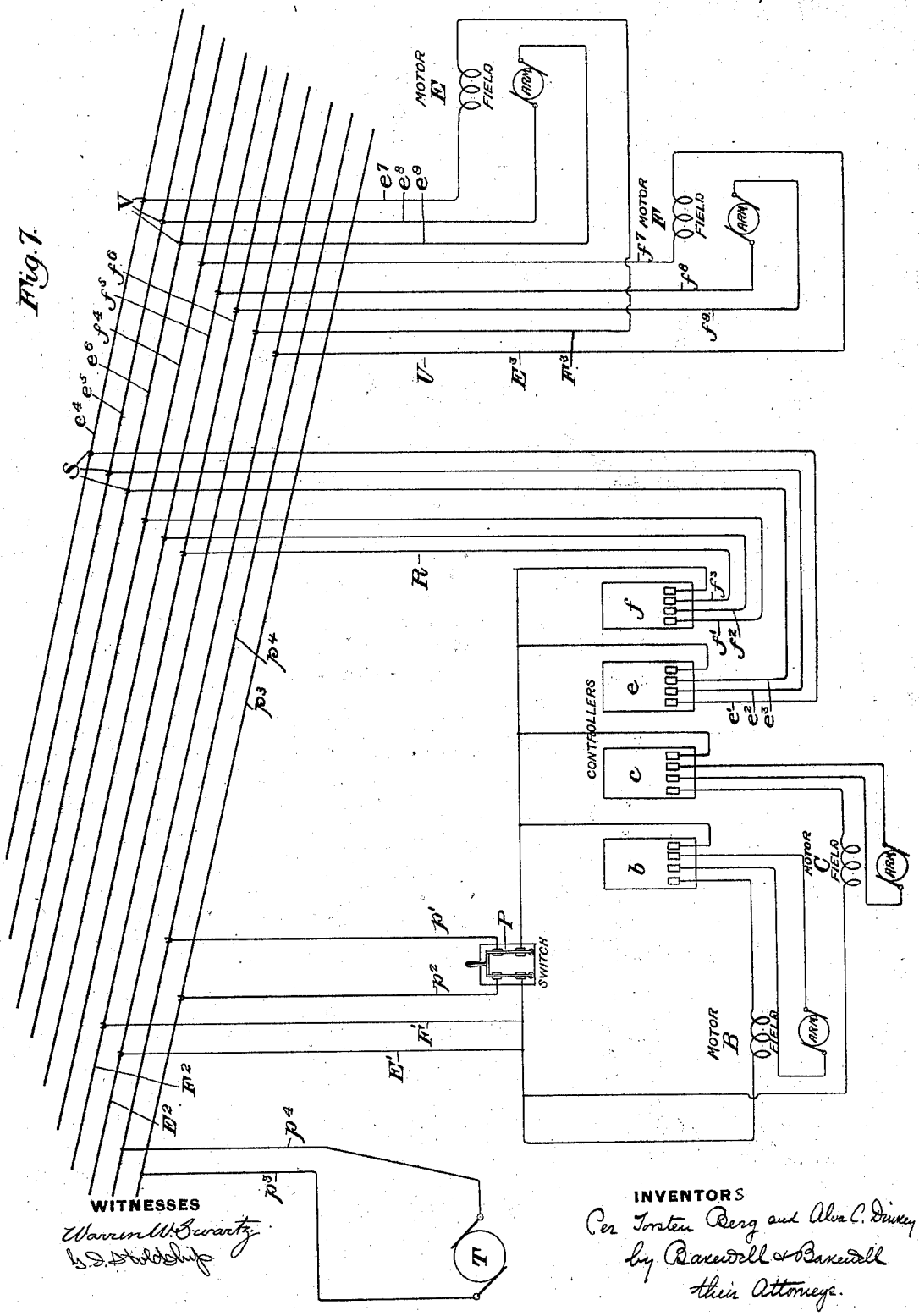

UNITED STATES PATENT OFFICE.

PER TORSTEN BERG AND ALVA C. DINKEY, OF MUNHALL, PENNSYLVANIA.

APPARATUS FOR CHARGING AND DRAWING FURNACES.

SPECIFICATION forming part of Letters Patent No. 577,712, dated February 23, 1897.

Application filed March 17, 1896. Serial No. 583,544. (No model.)

*To all whom it may concern:*

Be it known that we, PER TORSTEN BERG and ALVA C. DINKEY, of Munhall, in the county of Allegheny and State of Pennsylvania, have invented a new and useful Improvement in Apparatus for Charging and Drawing Furnaces, of which the following is a full, clear, and exact description, reference being had to the accompanying drawings, forming part of this specification, in which—

Figure 1 is a side elevation of charging apparatus constructed in accordance with our invention. Fig. 2 is a plan view showing that part of the charging apparatus which carries the tongs for introducing the metal ingot or bloom into and withdrawing it from the furnace. Fig. 3 is a plan view of that part thereof on which the ingot or bloom is carried. Fig. 4 is a vertical cross-section on the line IV IV of Fig. 1. Fig. 5 is an elevation showing in diagram the connections of the electrical conductors of the traveling contact-arm R. Fig. 6 is a similar view of the connections of the electrical conductors of the traveling contact-arm U, and Fig. 7 is a general diagram view of all the electrical circuits and their connections with the motors and the main generator.

Our improved charging apparatus comprises two parts—first, the charging device proper, consisting of a carriage or laterally-movable jib, which may be supported by wheels on an overhead track or on a ground track or may be arranged like the jib of a crane to travel on a circular arc, moving pivotally around a central mast, and which has tongs with mechanism for moving the same to grip or to release the metal piece and project the same into or withdraw it from the furnace, and, second, a buggy adapted to carry the metal piece after it has been withdrawn from the furnace to the feed-table of the rolling-mill or other place where it is to be worked. The buggy is preferably provided with feed-rollers and with a motor for rotating the same, so that by operation of the motor the metal piece may be discharged from the buggy onto the rollers of the feed-table.

Each of the parts of the apparatus above mentioned has electric motors for operating the movable elements thereof. The charging-carriage A has a motor B for causing it to travel back and forth on its track and a motor C for projecting or retracting the tongs, and the buggy D has a motor E for moving it on the track and a motor F for driving the feed-rollers.

In the drawings we show the carriage A, mounted upon wheels on a track G, and a buggy D, similarly mounted on a track H, which extends in front of the furnace to be charged or drawn, at which place it is parallel with the track G, and thence extends to the rolling-mill feed-table or other place to which the ingots, &c., are to be carried. The charging-carriage A has a beam or jib I, carrying the sliding head or frame J, on which the jaws of the tongs K are pivoted. The head J is connected by a rack J' to a pinion J², driven by suitable gearing from the motor C, so that by rotation of the pinion the head or frame J may be projected on the jib I into the furnace or may be retracted therefrom to carry the ingot to the buggy, as may be desired. The tongs are preferably provided with automatic mechanism for opening and closing the same, such as is described in a prior patent, No. 547,913, granted to Alva C. Dinkey on October 15, 1895, or they may be operated by other non-automatic mechanism. The motor B for moving the carriage on its track is connected with the wheels of the carriage by a shaft L and suitable gearing. The buggy D has journaled in its frame a series of feed-rollers M, connected by gearing N with the motor F, and its motor E is connected by gearing E' with its wheels.

In operating the apparatus to withdraw an ingot from the furnace the buggy D is brought opposite to the furnace-door, and the charging-carriage is also moved on its track to bring its tongs opposite to said door. The sliding head J is then projected to introduce the tongs into the furnace, the ingot is gripped, and the tongs are then retracted, so as to draw the ingot out from the furnace and to deposit it upon the feed-rollers of the buggy, upon which it is released. The buggy is then moved upon its track, so as to carry the ingot to the feed-table of the rolling-mill, where by setting the feed-rollers of the buggy into rotation the ingot is delivered to the feed-table and by it is fed to the rolls. The operation of charging the furnace is similar, the ingot being carried by the buggy to the furnace-door and then pushed by the tongs into the furnace. The buggy is moved independently of the charging-carriage, so that the latter need have only a short travel back and forth before the furnaces, while the buggy may be moved for a long distance. This results in much greater convenience and in more economy of operation than if the charging-carriage itself had to be moved with the ingot the entire distance between the furnaces and the feed-tables.

We have devised means by which the buggy and charging-carriage, thus independently movable, may be operated in all their motions by one operator, who rides upon the carriage or upon the buggy, and who therefore has the work of the apparatus directly under his control. For this purpose we place on the carriage a pulpit O or other suitable station for the operator, on which are set four controllers or rheostats $b\ c\ e\ f$, one for each of the four motors B, C, E, and F, and a switch P for cutting out all of the motors from circuit with the main generator, Figs. 5 and 7. All of the controllers are connected with the switch, as shown, and the controllers $b$ and $c$ are also connected in circuit, respectively, with the armatures and fields of the motors B and C. Four conductors $p'\ p^2$ $E'\ F'$ extend from the switch P, and three conductors $e'\ e^2\ e^3\ f'\ f^2\ f^3$ extend from each of the controllers $e\ f$ to a contact-arm R, each of said conductors terminating in a traveling contact S, consisting, preferably, of an insulated brass slide, and said slides are in contact, respectively, with conductors or wires $p^3\ p^4\ E^2\ F^2\ e^4\ e^5\ e^6\ f^4\ f^5\ f^6$, which extend along the path of motion of the carriage and (with the exception of the main-generator wires $p^3$ $p^4$) along the path of motion of the buggy also. The conductors $p^3\ p^4$ lead to the terminals of the main electric generator T. The conductors $E^2\ F^2$ are designed to carry the return current from the fields of the motors E and F on the buggy D, and the conductors $e^4\ e^5\ e^6$ and $f^4\ f^5\ f^6$ to carry the current to the fields and to and from the armatures of said motors. For this purpose we place on the buggy a contact-arm U, Figs. 6 and 7, having traveling contacts or slides V, which engage the several conductors $E^2\ F^2\ e^4\ e^5\ e^6$ and $f^4\ f^5\ f^6$, and from these contacts conductors $E^3\ F^3\ e^7\ e^8\ e^9\ f^7\ f^8\ f^9$ extend to the armatures and fields of the motors, as shown.

It will be seen from the foregoing description that by operation of the controllers and switch in the pulpit on the charger-carriage the operator can control any of the motors of the carriage and buggy. He can cut off the current from all or he can start, stop, and regulate the speed of the buggy, the feed-rollers thereon, the carriage, and the tongs, each being capable of operation independently and being under his perfect control.

We believe we are the first to combine two independently-movable carriages or buggies, each electrically operated by electric motors and controlled by suitable controlling devices at a single point, (located on one of the carriages or buggies or elsewhere;) also, such carriages or buggies in combination with a generator connected with controllers on one of the buggies or carriages, and traveling contacts connecting the motor or motors on one with the controllers on the other, so that all may be controlled by an operator on one of the buggies or carriages, and we intend to claim the same, broadly, without limitation to the particular construction of motors, traveling contacts, and controllers which we have illustrated in the drawings as being the preferable construction. We also make special claim to the combination of the several parts in a charging apparatus and special claim also for the construction of the parts which we have shown.

We claim as new—

1. In a charging or drawing apparatus for furnaces, the combination with a charging carriage or buggy having means for grasping and moving the metal pieces, and electric motors for moving the carriage and operating the tongs, of a separately-movable carriage or buggy adapted to receive the metal from the furnace, and having a motor for causing its travel, a main generator, controllers situated on one of the carriages or buggies, and line conductors connecting the controllers with the main generator and with said motors; substantially as described.

2. In a charging or drawing apparatus for furnaces, the combination with a charging carriage or buggy having means for grasping and moving the metal pieces, and electric motors for moving the carriage and operating the tongs, of a separately-movable carriage or buggy adapted to receive the metal from the furnace, and having a motor for causing its travel, controllers on one of the carriages or buggies, line conductors for connecting the controllers with the main generator and with the motors on the other carriage or buggy, and traveling contacts on the last-named carriage or buggy, making contact with the line conductors; substantially as described.

3. In a charging or drawing apparatus for furnaces, the combination with a charging-carriage having means for grasping and moving the metal pieces, and electric motors for moving the carriage and operating the tongs, of a separately-movable buggy adapted to receive the metal from the furnace, and having a motor for causing its travel, conductors leading from the main generator along the path of travel of the charging-carriage, other conductors leading from the path of travel of the charging-carriage to and along the path of travel of the buggy, traveling contacts on the buggy connecting the motors thereof with said conductors, and controllers on the carriage also connected with said conductors and with the motors on the carriage, whereby the motors on both may be independently operated from the carriage; substantially as described.

4. In charging or drawing apparatus for furnaces, the combination of a traveling carriage carrying means for grasping and moving the metal pieces, an independently-movable buggy movable between said carriage and the furnace and adapted to receive such metal pieces, and mechanism for controlling the movements of said carriage and buggy from a single operating-station; substantially as described.

In testimony whereof we have hereunto set our hands.

PER TORSTEN BERG.
ALVA C. DINKEY.

Witnesses:
H. H. HERVEY,
W. H. CORBETT.